United States Patent [19]
Anderson

[11] Patent Number: 6,016,225
[45] Date of Patent: Jan. 18, 2000

[54] DATA CARD WITH LENTICULAR OPTICAL DISPLAY

[75] Inventor: Michael R. Anderson, Boca Raton, Fla.

[73] Assignee: Vision International Production, Inc., Boca Raton, Fla.

[21] Appl. No.: 08/966,105

[22] Filed: Nov. 7, 1997

[51] Int. Cl.[7] .................................................. G02B 27/10
[52] U.S. Cl. ........................ 359/619; 359/626; 359/463; 348/42; 430/324
[58] Field of Search ................................. 359/619, 618, 359/620, 626, 463; 348/40, 42; 430/321, 324, 325

[56] References Cited

U.S. PATENT DOCUMENTS

| | | |
|---|---|---|
| 2,815,310 | 12/1957 | Anderson . |
| 4,012,116 | 3/1977 | Yevick ..................................... 359/619 |
| 4,420,221 | 12/1983 | Sparks . |
| 4,727,533 | 2/1988 | Erbert ...................................... 359/626 |
| 4,920,039 | 4/1990 | Fotland et al. ........................... 359/619 |
| 4,935,335 | 6/1990 | Fotland .................................... 359/619 |
| 5,543,965 | 8/1996 | Biolluski et al. ....................... 359/463 |
| 5,581,402 | 12/1996 | Taylor ...................................... 359/463 |
| 5,642,226 | 6/1997 | Rosenthal ................................ 359/619 |
| 5,680,171 | 10/1997 | Lo et al. ................................... 348/42 |
| 5,712,731 | 1/1998 | Drinkwater et al. .................... 359/619 |

*Primary Examiner*—Loha Ben
*Attorney, Agent, or Firm*—Malin, Haley, DiMaggio & Crosby, PA

[57] ABSTRACT

A data card, such as a credit or debit card, having first and second sides, wherein the first side includes data card information stored on a magnetic strip and embodied in embossed alpha-numeric indicia, and the second side includes a surface having a series of optically related image lines thereon, and an optically transparent layer attached thereto and forming a lenticular lens, the optically transparent layer and optically related image lines forming a lenticular optical system capable of alternately displaying images.

3 Claims, 2 Drawing Sheets

DATA CARD WITH LENTICULAR OPTICAL DISPLAY

BACKGROUND OF THE INVENTION

1. Field of the Invention

The present invention relates to data cards, such as credit cards, and more particularly to data card having a lenticular optical system, including a lenticular optical display for visually displaying a series of images.

2. Description of the Background Art

Data cards, such as credit cards, debit cards, and general or personal information cards, are well known items in common use in modern society. For example, credit cards provide consumers with a compact device that contains a wide variety of information printed or stored thereon. Furthermore, the use of data cards for containing personal, medical, financial, or business information is leading to increasing use of such cards. There are a number of ways that information can be stored on data cards. For example, information may be: printed or embossed as numbers or indicia; stored on a magnetic strip; or contained on microfiche or computer chip; or presented as a holographic image. Data cards are typically manufactured to generally accepted standard specifications to facilitate use world wide.

Meanwhile, in the non-analogous art of lenticular optical technology, advances in the design and manufacture of lenticular optical systems have led to increased use of lenticular arrays. Lenticular lenses are well known in the art for use in optical systems to produce various types of optical effects. Lenticular optical systems known in the background art generally include a transparent sheet having a planar surface on one side thereof and on the other side, a series of parallel longitudinal convex ridges forming a multi-lenticular system of convex lenses. A print sheet is typically disposed behind the lens adjacent to the planar surface. The print sheet contains a series of spaced image lines constituting a dissection or breakup of a master image. The series of spaced image lines are optically related with respect to the lens elements as to be alternately visible upon positional changes of the observer with respect to the lenses. When viewed from a first position a first series of image lines are visible and display a first composite image. When viewed from a second position a second series of image lines are visible and display a second composite image. U.S. Pat. No. 2,815,310, issued to Anderson, discloses an example of a dual image lenticular optical system.

In addition, further advances in lenticular optical systems have resulted in an increase in the number of observable frames available. The increase in observable frames has made lenticular animation possible. Therefore, as the observer moves relative to the lenticular viewing screen, a series of pictures come successively into view thus creating the impression of continuous changes in the phases of motion. Accordingly, current lenticular optical technology is capable of producing a composite image of a series of N scenes resulting in an animation picture when viewed properly at successive viewing angles. In addition, such technology may be used to display a wide variety of useful information, such as account information.

Accordingly, there exists a need for a data card having a lenticular array disposed on a side thereof for displaying aesthetically pleasing animated images and/or for displaying useful information to the card carrier.

SUMMARY OF THE INVENTION

A data card, having first and second sides, wherein a first side includes data card information stored on a magnetic strip and embodied in embossed alpha-numeric indicia, and wherein a second side includes a surface having a lenticulated array of images thereon, and a substrate forming a lenticular lens substantially adjacent thereto, thereby forming a lenticular optical system capable of displaying animated images and/or other useful information. A data card according to the present invention provides the capabilities and convenience of a conventional data card, such as a credit card, and the added benefits of a lenticular display for displaying animated or non-animated images and/or other useful information. Furthermore, the invention may include at least a portion thereof that comprises a transparent lenticluar display.

Accordingly, it is an object of the present invention to provide a data card which includes a lenticular optical system.

Yet another object of the present invention is to provide a data card having on one side thereof embossed alpha-numeric indicia and a magnetic strip containing account information, and on the other side thereof a lenticular array capable of displaying a wide variety of images and/or information.

Still another object of the present invention is to provide a data card with a lenticular display that is manufactured to data card standard specifications and which includes two sets of magnetic strips and embossed indicia.

In accordance with these and other objects which will become apparent hereinafter, the instant invention will now be described with particular reference to the accompanying drawings.

DESCRIPTION OF THE PREFERRED EMBODIMENTS

Figure 1:
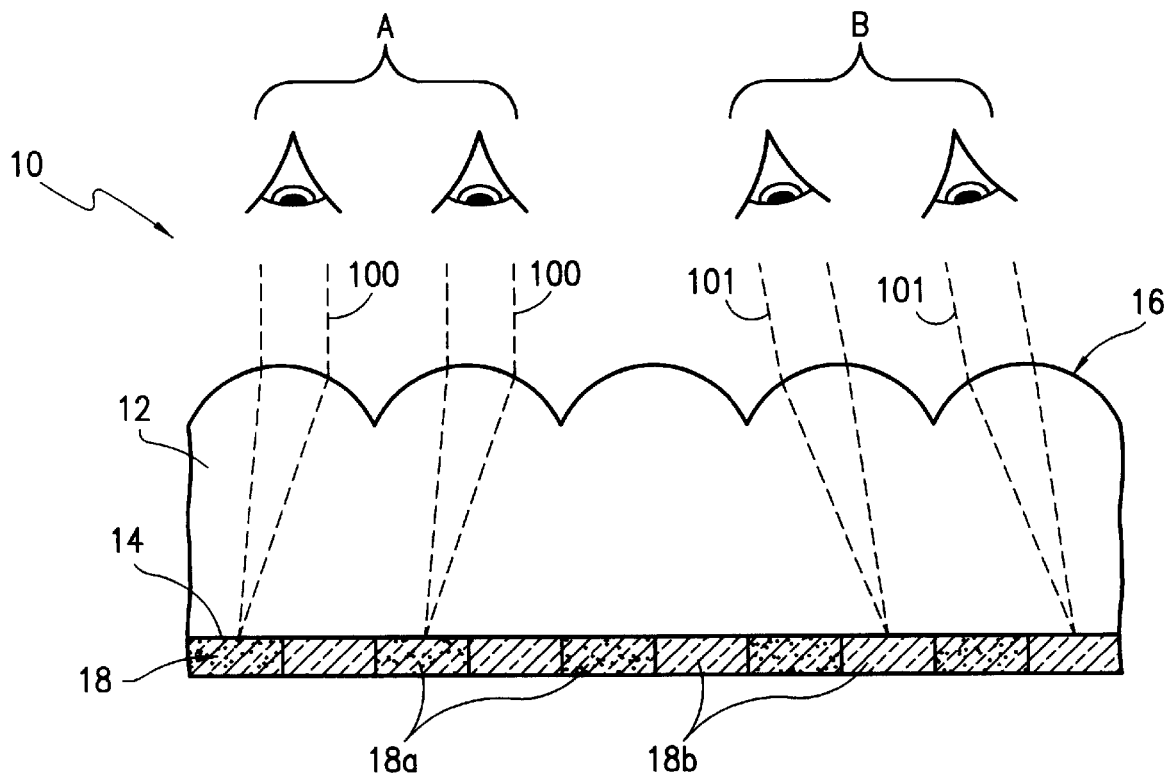
FIG. 1 is a side sectional view of a lenticular optical system including a diagrammatic depiction of the optical principles.

FIG. 1 shows a sectional side view of a lenticular optical system of the background art, generally referenced as 10, which includes an optically transparent lenticular lens 12 having a generally planar surface 14 and a series of parallel longitudinal convex ridges forming a series of convex lenses, generally referenced as 16. A print sheet 18 is disposed behind the lens and adjacent to planar surface 14. Print sheet 18 contains at least two alternate series of spaced image lines, referenced as 18a and 18b, constituting a dissection or breakup of a master image, or alternatively two discrete images.

As diagrammatically illustrated in FIG. 1, the series of spaced image lines are optically related with respect to the lens elements as to be alternately visible upon positional changes of the observer with respect to the lenses. For example, when viewed from a first observation position, referenced as "A," a first series of image lines are visible and display a first composite image. Specifically, when viewed from observation position "A," the optical lines of sight 100 are refracted by convex lenses 16 toward first image lines 18a so that the observer sees a coherent and comprehensive image corresponding to the image represented by first image lines 18a. On the other hand, when viewed from a second observation position "B," a second series of image lines are visible and display a second composite image. Similarly, when viewed from observation position "B", the optical lines of sight 101 are refracted by convex lenses 16 toward second image lines 18b so that the observer sees a coherent and comprehensive image corresponding to the image represented by second image lines 18b.

As previously discussed, advances in lenticular optical systems have resulted in an increase in the number of image sets available for use with lenticular lenses. The increase in observable image sets has made lenticular animation possible. Therefore, as the observer moves relative to the lenticular viewing screen, a series of pictures come successively into view thus creating the impression of continuous changes in the phases of motion. Accordingly, to the extent that the disclosure and diagrammatic representations herein may be limited to first and second image sets, the present invention contemplates the use of a large number of observable image sets, and particularly a sufficient number of image sets to achieve animation effects where desired.

Figure 2:
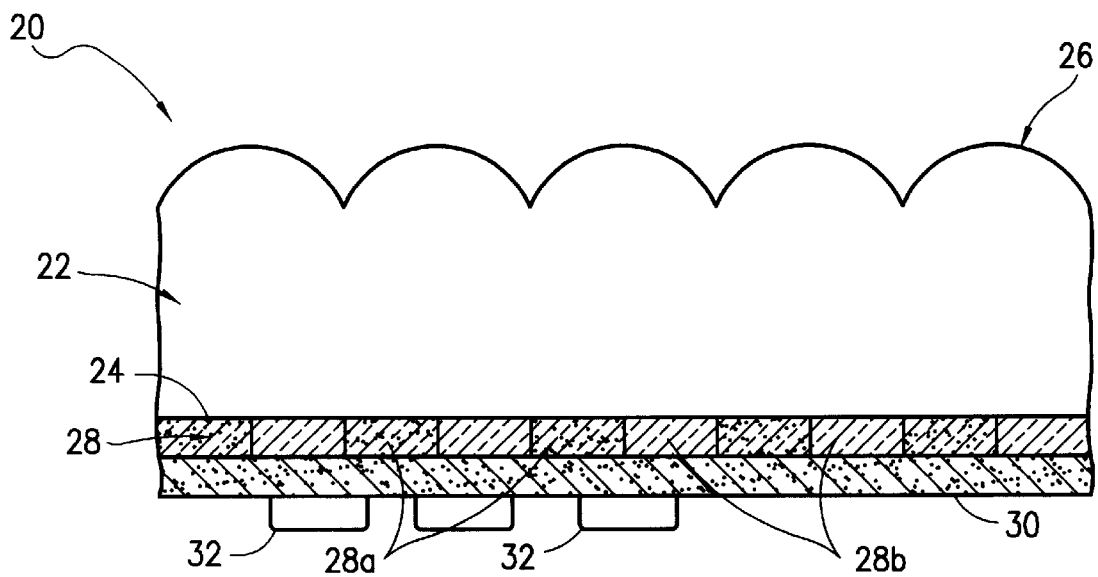
FIG. 2 is a side sectional view of a preferred embodiment of the present invention.

FIGS. 2–5 depict a preferred embodiment of a data card according to the present invention. FIG. 2 depicts a side sectional view of a preferred embodiment of a data card, generally referenced as 20, having a lenticular optical system incorporated on a side thereof, according to the present invention. Data card 20 includes an optically transparent lenticular lens 22 defining a generally planar surface 24 on one side thereof, and defining series of parallel longitudinal convex ridges forming a series of convex lenses, generally referenced as 26, on the opposite side thereof. While the preferred embodiment of the present invention contemplates a lenticular lens having a series of convex lenses, it is contemplated that any suitable lenticular lens structure is within the scope of the present invention. A print sheet 28 is disposed behind the lens and adjacent to planar surface 24. Print sheet 28 contains at least two alternate series of spaced image lines, referenced as 28a and 28b, constituting a dissection or breakup of a master image or images. Data card 20 further includes an opaque substrate 30, which is best shown in plan view in FIG. 3. In an alternate embodiment, image lines may disposed directly on opaque substrate 30, thereby eliminating the need for a separate print sheet.

Figure 3:
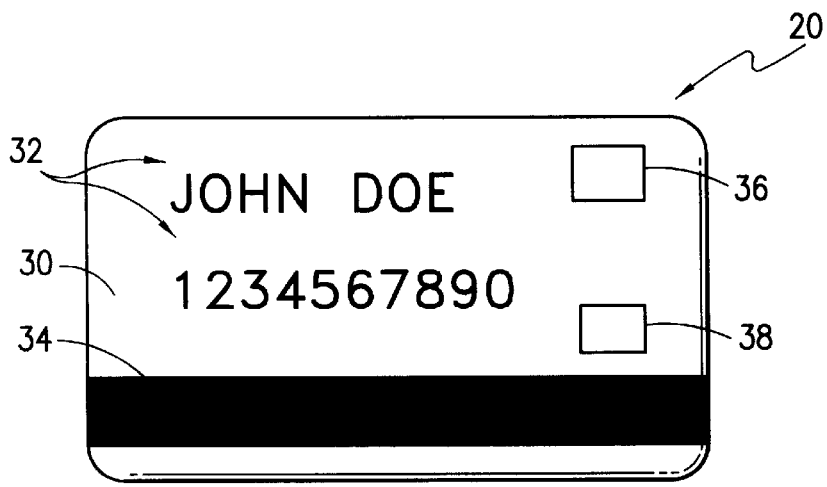
FIG. 3 is a plan view of a first side of a data card according to the present invention.

As depicted in FIG. 3, substrate 30 contains a wide variety of information printed or stored thereon. For example, as is found on conventional credit cards, the data card holder's name and account number appear as embossed alpha-numeric indicia, referenced as 32, to facilitate use of the data card with a manually operated receipt generating carbon copy imprint machine. Furthermore, substrate 30 includes a magnetic strip 34 for storing additional information and to facilitate use of data card 20 with various electronic transaction devices commonly found in modern society. In an alternate embodiment, data card 20 may include two magnetic strips thereby allowing the card to function as a dual data card (e.g. data card having two accounts), wherein magnetic strips are affixed to the top and bottom portions of the card. In addition, a data card according to the present invention may further include a portion thereof containing holographic image 36 for protection against forgery. Furthermore, information may also be stored on a portion of substrate 30 reserved for a computer chip 38, or micro-fiche. In addition, substrate 30, or a portion thereof, may be fabricated from a material that glows in the dark, or may include a power source, such as a battery, to provide illumination for the user. Furthermore, a data card according to the present invention may include numbered indicia for indicating that the card is one of a series (e.g. 1 of 10,000, 2 of 10,000, etc.) for authenticity and security purposes. A data card according to the present invention is preferably manufactured to accepted standards and specifications to facilitate use world wide.

In an alternate embodiment, opaque substrate 30 may encompass a fractional portion of the data card surface area thereby enabling the remaining data card surface area to comprise a transparent lenticular display. Furthermore, the present invention contemplates a completely transparent lenticular data card wherein the embossed alpha-numeric indicia, referenced as 32, is formed on a transparent film. In that embodiment, it is contemplated that the embossed surfaces may be painted black to allow the indicia to be visually perceptible.

Figures 4A, 4B:
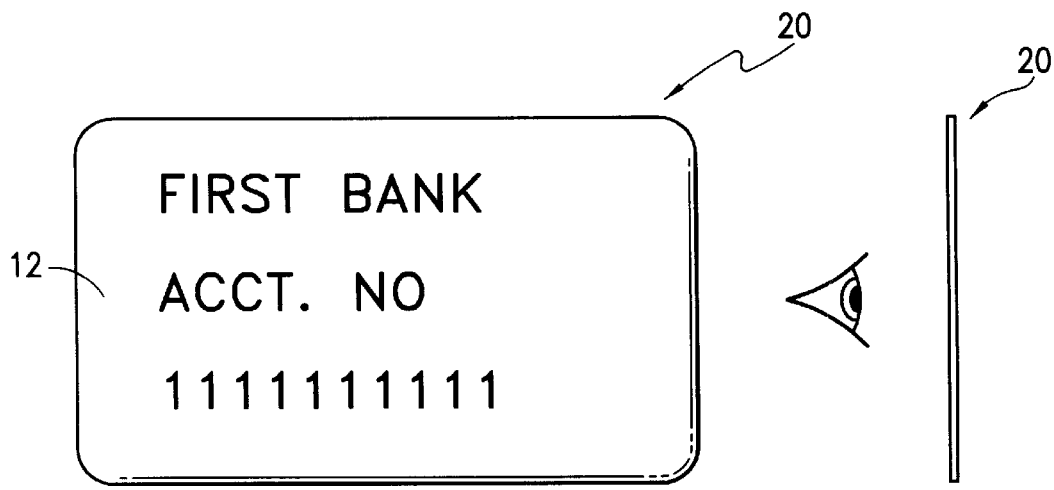
FIG. 4A is a plan view of a second side of a data card according to the present invention in a first optical configuration.
FIG. 4B diagrammatically depicts the orientation of the data card with respect to the observer in the first optical configuration of FIG. 4A.
Figures 5A, 5B:
FIG. 5A is a plan view of the second side of a data card according to the present invention in a second optical configuration.
FIG. 5B diagrammatically depicts the orientation of the data card with respect to the observer in the second optical configuration of FIG. 5A.

FIG. 4A depicts a plan view of the side of the data card incorporating the lenticular optical system wherein the lenticular display is used to contain and display the card holder's personal financial information; however, it should be apparent that use of the lenticular display to display graphic animation is considered within the scope of the invention. FIG. 4B depicts the relationship between an observer and data card 20. Accordingly, when the observer views the lenticular side of data card 20 in the positional relationship shown in FIG. 4B, the lenticular viewing screen displays the information as seen in FIG. 4A. Similarly, FIG. 5A also depicts a plan view of the side of the data card incorporating the lenticular optical system. FIG. 5B depicts an alternate relationship between an observer and data card 20. Specifically, as seen in FIG. 5B, data card 20 is angularly disposed with respect to the observer. Accordingly, when the observer views the lenticular side of data card 20 in the positional relationship shown in FIG. 5B, the lenticular viewing screen displays the information as seen in FIG. 5A. Although, the examples depicted in FIGS. 4A, 4B, 5A, and 5B, show but two discrete images the present invention contemplates embodiments having up to approximately 500 discrete images, thereby maximizing the amount of information available and/or producing high quality animated or non-animated images.

As is apparent, the present invention combines a data card, such as a credit card, phone card, debit card, ATM card, insurance card, personal information card, and the like, with lenticular optical technology to provide an improved data card that retains all of the structure and function of a conventional data card, while incorporating the heretofore unrealized benefits from the non-analogous art of lenticular optics.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A data card, having first and second sides, wherein a first side includes data card information stored on a magnetic strip and embodied in embossed alpha-numeric indicia, and wherein a second side includes a surface having a series of optically related image lines thereon, and an optically transparent layer attached thereto, said optically transparent layer forming a lenticular lens, said optically transparent layer and said optically related image lines forming a lenticular optical system capable of alternately displaying images.

2. A data card according to claim 1, wherein said alternately displayed images comprise observable frames which appear in a successive sequence thereby creating the impression of phases of motion.

3. A combination data card and lenticular optical system comprising:

a substantially planar sheet having first and second sides, said first side having embossed alpha-numeric indicia thereon, and including a means for storing data;

said second side containing an optical means for alternately displaying visible images upon positional changes of the observer with respect to said second side.

\* \* \* \* \*